(No Model.) 4 Sheets—Sheet 1.

W. BAXTER, Jr.
ELECTRIC ELEVATOR.

No. 466,973. Patented Jan. 12, 1892.

Attest:
L. Lee.
F. C. Fischer

Inventor.
W. Baxter, Jr.,
per Crane & Miller, Attys (No Model.)

W. BAXTER, Jr.
ELECTRIC ELEVATOR.

No. 466,973.

4 Sheets—Sheet 4.

Patented Jan. 12, 1892.

Attest:
L. Lee
F. C. Fischer

Inventor.
W. Baxter, Jr., per
Crane & Miller, Attys.

ical hoisting appa-
UNITED STATES PATENT OFFICE.

WILLIAM BAXTER, JR., OF BALTIMORE, MARYLAND, ASSIGNOR TO THE BAXTER ELECTRIC MOTOR COMPANY, OF SAME PLACE.

ELECTRIC ELEVATOR.

SPECIFICATION forming part of Letters Patent No. 466,973, dated January 12, 1892.

Application filed September 3, 1888. Serial No. 284,397. (No model.)

*To all whom it may concern:*

Be it known that I, WILLIAM BAXTER, Jr., a citizen of the United States, residing in the city of Baltimore, in the State of Maryland, have invented certain new and useful Improvements in Systems of Operating Electric Elevators with Constant-Potential Motors, fully described and represented in the following specification and the accompanying drawings, forming a part of the same.

The present invention relates partly to means of electrically actuating the switch of an electric motor, partly to the construction and arrangement of switches for operating electric hoisters with a current of constant potential, and partly to special apparatus for locking the landing-doors of a hoistway. The constant-potential circuits referred to herein would be furnished by a dynamo-electric machine constructed or regulated to furnish such a current, and it would therefore be wholly inadmissible to permit a short circuit in any part of the system, as such short circuit would induce a current of abnormal strength in the "dynamo," and result in great injury thereto by the destruction of its insulation or its connections. In such a system it is therefore absolutely necessary when directing the current through a revolving armature or other structure in which a counter electro-motive force may be induced to provide the switches with resistances which may be gradually cut out of the circuit as such electro-motive force increases. By the use of such resistances a short circuit is prevented and the entire construction is adapted for operation with a circuit used to distribute power from a central station.

Figure 1:
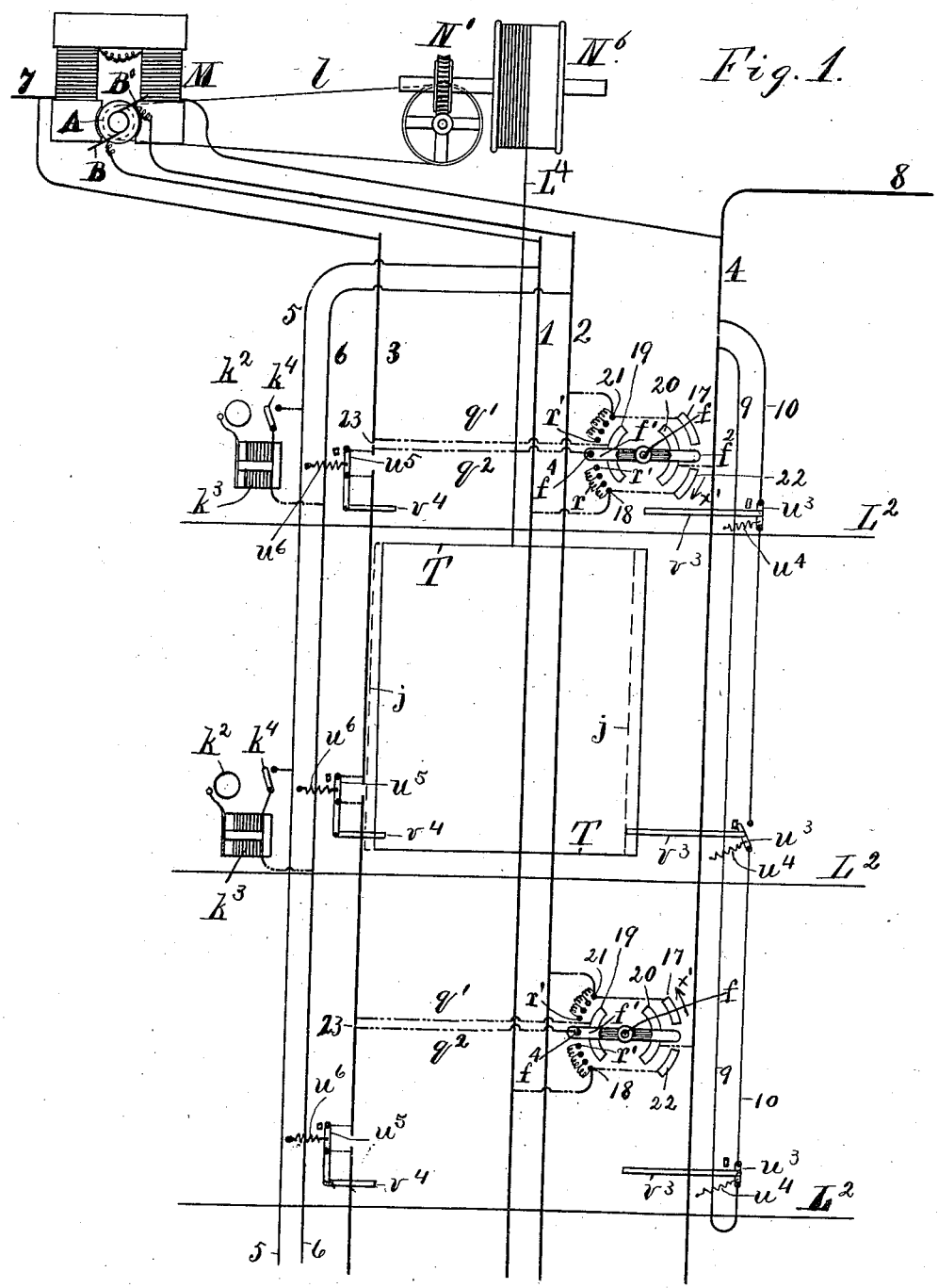
Figure 2:
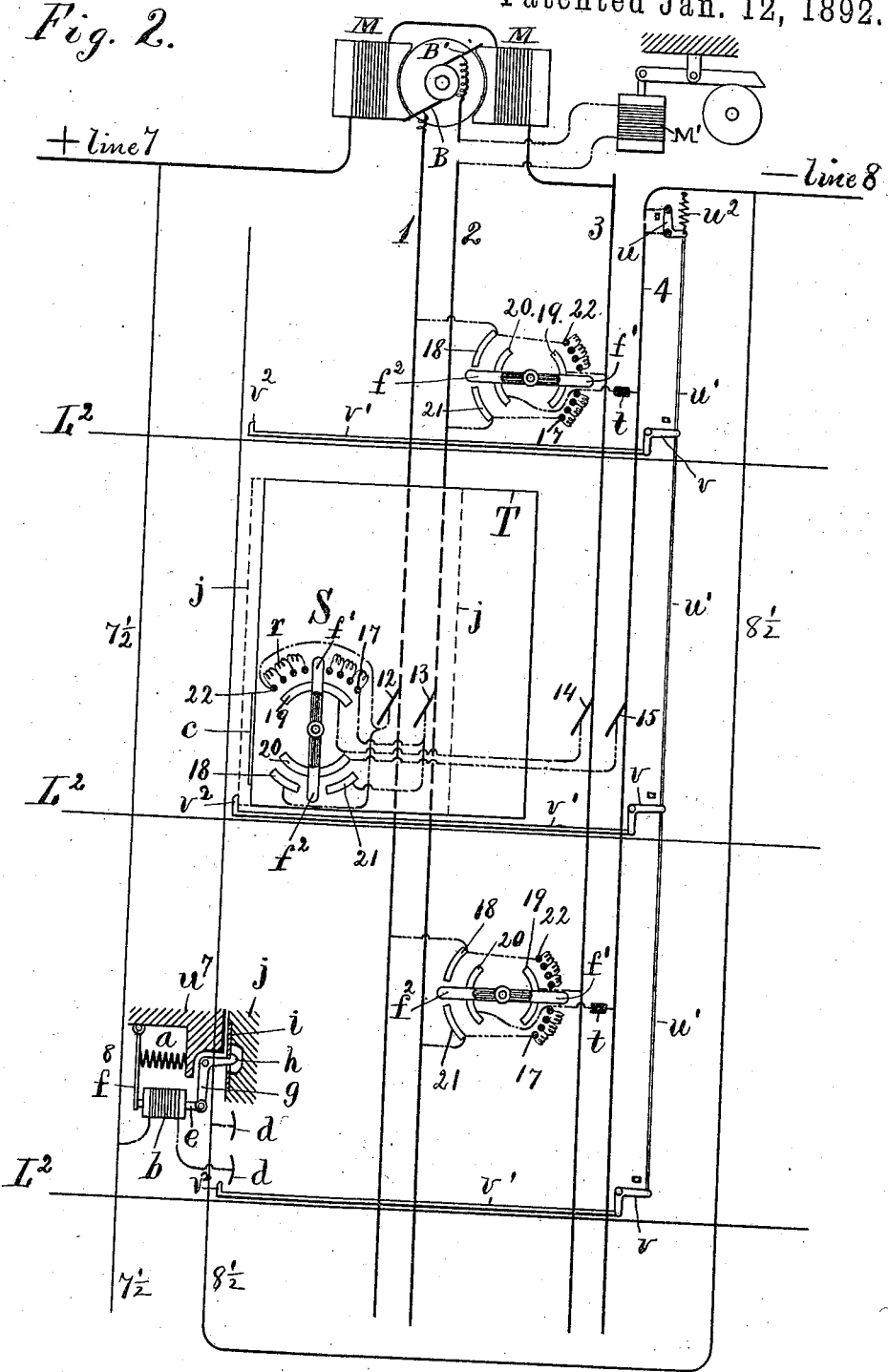
Figure 3:
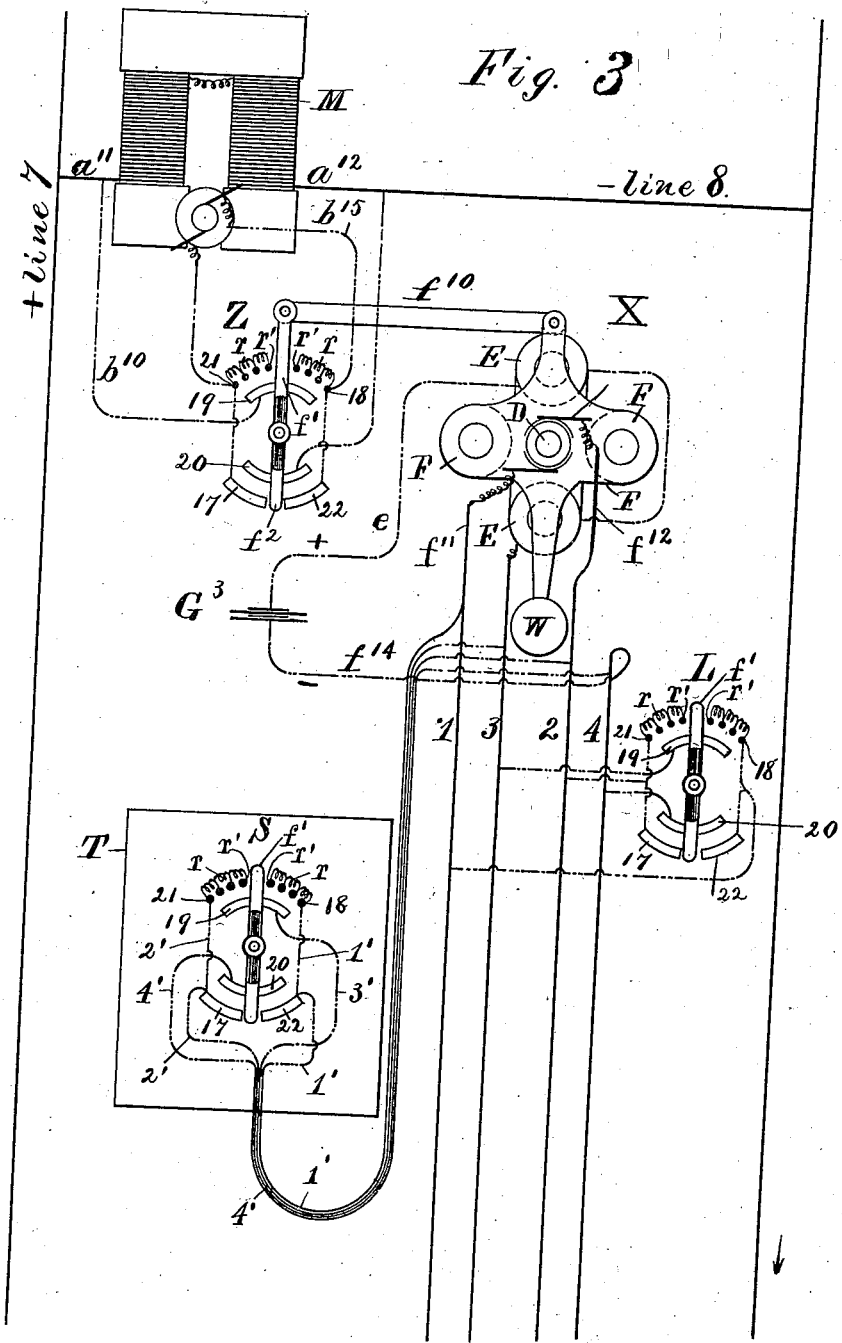
Figure 4:
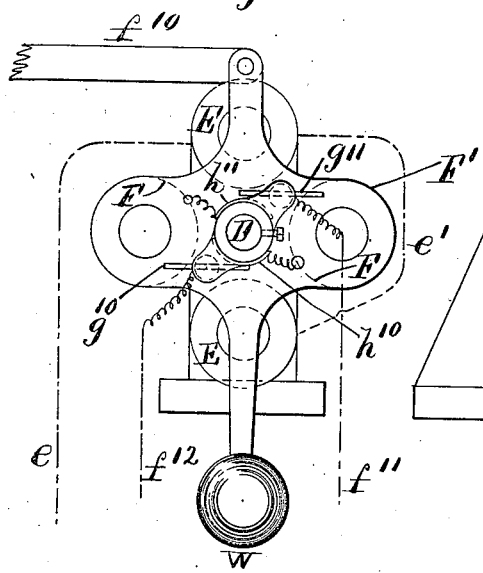
Figure 5:
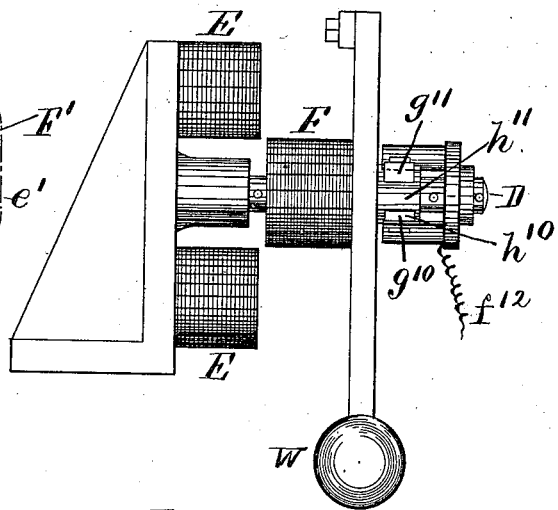
Figure 6:
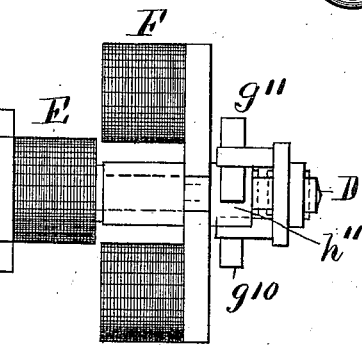

Figure 1 of the drawings shows an electric motor connected with a worm-hoisting apparatus by means of a belt and pulleys and the car suspended by a rope from a hoisting-drum, the circuits being adapted for landing-switches only. In Fig. 2 I have omitted the hoisting mechanism and shown only a diagram of the motor with circuits provided with landing-switches and with a car-switch having sliding contacts applied to fixed conductors on the hoistway. Fig. 3 shows a circuit and generator independent of the motor-circuit for actuating an electro-magnetic shifting device to shift a switch in the motor-circuit, the car-switch and landing-switch being included in such independent circuit. Fig. 4 is a front view, upon a larger scale, of the switch-shifter X in Fig. 3. Figs. 5 and 6 are respectively a side view and a plan of the shifter upon the same scale as Fig. 4.

In Fig. 1, M is the motor, and $N^6$ the hoisting-drum, connected therewith by suitable worm-gearing N' and pulleys provided with a belt $l$.

A car T is suspended from the drum by a rope $L^4$, and the stoppage of the motor operates to stop the drum and car, while its motion in opposite directions operates to elevate or lower the car, as desired.

B and B' are the brushes applied to the motor-commutator, and the motor is shown shunt-wound, the positive conductor 7 furnishing a part of the current to the field-coils and the remainder passing through the switch-circuits to the brush B or B' at the pleasure of the operator. The hoistway is omitted to expose the electrical connections, and the conductors 1, 2, 3, and 4 are shown arranged along the path of the car, the conductors 1 and 2 being connected with the brushes B and B', the conductor 3 with the positive line-wire 7, and the conductor 4 with the negative line-wire 8. The circuits are shown in the figure connected with landing-switches only, and provided with segmental contacts 19 and 20, connected, respectively, with the conductors 3 and 4, adjacent to which contacts are arranged others connected, respectively, with the conductors 1 and 2. Adjacent to the segment 19, which receives the current from the conductor 3, are shown contact-studs $r'$, having intermediate resistances $r$, the last stud 21 in one of the series being connected with the conductor 2, as is also a contact 17, adjacent to the segment 20. The last stud 18 in the opposite series of resistance-contacts is connected with the conductor 1, as is the contact 22, near the end of segment 20, opposite the contact 17. A circuit-controller for electrically joining the segments with the adjacent studs is shown formed as a lever pivoted between the segments upon a stud $f$ and provided at one end with a metallic leaf or spring $f'$, adapted to connect the segment 19 with its adjacent contacts, and at the opposite end with a spring $f^2$ for connecting the segment 20 with its adjacent contacts 17 and 22. The springs are insulated from each other. When the right-hand end $f^2$ of the circuit-controller is turned to the right, as indicated by the arrow upon the upper switch in the figure, the segment 19 becomes electrically connected by the leaf $f'$ with the contact 21 and diverts the current from the conductor 3 into the brush B'. The leaf or spring $f^2$ at the same time connects the segment 20 with the contact 22, thus joining the conductors 1 and 4 electrically, and thus furnishing a course for the current from the brush B to the line-wire 8. The circuit-controller when turned to the left, as indicated by the arrow upon the lower switch in the figure, connects the segment 19, which receives the current from conductor 3, with the brush B, (through the stud 18 and conductor 1,) and at the same time connects the segment 20, which is joined to the negative conductor 8, with the brush B' by contact 17 and conductor 2. It will be noticed that the conductor 3 is formed with openings or breaks 23, which are normally closed by connections $q'$ and $q^2$, which are united, respectively, to the segment 19 and to a stud $f^4$ opposite the middle of the same in each switch. The spring $f'$ is shown in the figure in its middle or normal position, and then serves to connect the segment 19 with the middle contact $f^4$, so as to maintain the circuit unbroken through the conductor 3 when each switch lever or connector is in its normal position. The switch farthest from the motor may thus receive the current from the conductor 3 and regulate the movements of the current in the circuits so long as the other switch-levers are unmoved. The movements of the spring $f'$ in any switch operates, however, to disconnect the stud $f^4$ from the adjacent segment 19, and thus breaks the continuity of the conductor 3 beyond such switch, so that when the car is moving under the control of any particular switch the movement of one farther from the armature will not affect it. If the motor or other electro-magnetic hoister-shifting apparatus were at the lower end of the hoistway and were connected with the lower ends of the conductors 1, 2, 3, and 4, it is obvious that the lower switch of the series would be nearest the electro-magnet and would control its operation. To advise the operator at any landing, except that nearest the electro-magnet, if the switch nearest the magnet is turned, indicators may be located at such landings and connected with a circuit derived from the motor-armature, as claimed in my patent, No. 449,611, issued March 31, 1891. Such indicators are shown in Fig. 1 as bells $k^2$, affected by bell-magnets $k^3$, the coils of which are electrically connected with the brushes B' by the conductors 5 and 6, when a switch $k^4$ connected with each indicator is closed. The armature A, when in motion, sets up a counter electro-motive force to actuate the indicators. The indicator-switches $k^4$ would be held normally open and closed by the operator only when desiring to learn whether the motor was already in operation before actuating the landing-switch, the ringing of the bell then showing if the motor was in motion. In Fig. 2 the same kind of landing-switches are used, except that the conductors are shown continuous and the stud $f^4$ is omitted from the switch. The motor is shown series-wound and having the terminal of the field-coils (which are connected with the + line 7) united to the conductor 3, which is joined to the segment 19, as in Fig. 1. Three landings $L^2$ are shown in the figure, with landing-switches upon the upper and lower landings, and a car (represented by a rectangle) at the middle landing and provided with a car-switch S, similar to the landing-switches.

Sliding contacts 12, 13, 14, and 15 are shown applied, respectively, to the conductors 1, 2, 3, and 4 and connected with the same contacts in the car-switch as their respective conductors are connected with in the landing-switches. The segments 19 and 20 in each of the switches are connected, respectively, with the primary conductors 7 and 8 through the conductors 3 and 4, which are connected therewith, and the other contacts in each switch permit the lever or connector to close circuits through the motor or other electro-magnetic apparatus. The switches are therefore, by virtue of the contact-segments 19 and 20, arranged in multiple arc between the primary conductors, as is common in arranging a series of connections to be operated by a current of constant potential.

With such construction as that shown in Fig. 2, the switch nearest the electro magnet would control its operation, as its circuit-controller would close a circuit for the current and would cut off the circuit from the more remote switches. Should a landing-switch be turned in the same direction as the car-switch, it would connect the same conductors; but if a car-switch were turned in one direction to connect the conductors 3 and 1 while the landing-switch was turned to connect conductors 1 and 4 a short circuit would be made and serious injury would be done to the dynamo generating the current for the motor-circuit. To prevent such short circuit, fusible plugs $t$ may be inserted in the connections between the landing-switches and the conductor 4, or at any other suitable point. In a system adapted for constant current door-switches may be used to form, when actuated by the opening of the door, a short circuit, and thus prevent the motor from being started until the door is closed. In any construction with constant potential a short circuit is inadmissible and the door-switches may be arranged to open the circuit, as is shown in Figs. 1 and 2.

In Fig. 2 a single switch $u$ is shown (in its closed position) inserted in the conductor 4 and connected by a link $u'$ with bell-cranks $v$ at each of the landings. A rod $v'$ is shown at each landing extended beneath the door, which is indicated by dotted lines $j$ at the middle landing. The door at each landing, when closed, presses upon a hook $v^2$ at the end of the rod $v^4$ and operates in opposition to a spring $u^2$ (which holds the switch normally open) to hold the switch $u$ closed. The landing-door is shown only at the middle landing, where the car T is represented, but would operate the same upon the hook $v^2$ at each of the other landings, being opened by a movement to the right, which would release the hook $v^2$ and permit the spring $u^2$ to open the switch $u$ and thus open a circuit until the door were again closed. In Fig. 1 the conductor 4 is shown broken at the same point as in Fig. 2; but instead of placing a single switch at such break and operating the same by mechanical connections to the different landings, a branch circuit or loop formed by the wires 9 and 10 is extended to each of the landings, and at each a separate switch $u^3$ is inserted therein. Each switch would be held normally open, like the switch $u$, by a spring $u^4$ when the door was open, the switch being provided with a rod $v^3$, against which the edge of the door would push to close the switch when the door was shut. The door shown by the dotted lines $j$ is shown only at the middle landing, where the car T is placed, and the door is shown partially opened by a movement to the left, so that the switch $u^3$ at such landing is opened and the circuit through the wires 9 and 10 is therefore broken.

Instead of extending a loop of the circuit to each landing, a break may be made at each landing in one of the conductors, as conductor 3 in Fig. 1, and a switch be applied to each break to maintain the continuity of the conductor when the landing-door is shut. The switches in such conductor are lettered $u^5$ and provided with springs $u^6$, which would serve to automatically open the switch when the door was moved away from the end of the push-rod $v^4$, and the circuit be thus held open until the door was closed.

The switches $u^5$ are all shown closed in Fig. 1, as it would only confuse the drawings to show a landing-door in position to open one of the same. A door-lock is shown in Fig. 2 adapted to be operated by a solenoid magnet $b$, connected with wires 7½ and 8½ in a branch circuit from the line-wires 7 and 8 by means of spring-contacts $d$ and a plate $c$ upon the side of the car T. To avoid obscuring the drawings, only a portion of the door-frame $u^7$ is shown, having a bolt with a hooked head $h$ fitted therein and provided with an arm $g$, attached to the core $e$ of the magnet $b$. A spring $a$ is attached at opposite ends to the door-frame and to a lever $f^8$ and presses the lever normally upon the rear end of the core $e$ to force it outward to cause the hooked bolt-head $h$ to engage a plate $i$ upon the edge of the door $j$. The attraction of the solenoid magnet $b$ operates when the current in its coils is closed to draw the core $e$ within the magnet and thus unlocks the door. The hooked form of the bolt-head enables it to engage the door automatically when the door is being closed, and the spring $a$ then serves to hold the door-bolt in its locked position until the car in its movement to such door-landing brings the plate $c$ into contact with the springs $d$ and closes the main circuit through the magnet-coil $b$. The door may then be opened, so long as the car remains at the landing; but when it moves away from the same the branch circuit through the door-lock magnet is again broken and the bolt held in its locked position by the spring $a$. An electro-magnetic shifter may be used to actuate a switch in the motor-circuit, and such electro-magnetic shifter may be operated by a current derived from the motor-circuit, or an independent generator may be used to operate such shifter and the hand-switches inserted in such independent circuit. Such construction is shown in Fig. 3, the car-switch being connected with the conductors by a cable, and the independent generator $G^3$ being connected with the switch upon the car and with a landing-switch in the circuits of the electro-magnetic shifter. M is the magnet of the motor, which is shown shunt-wound and connected with a circuit and motor-switch Z, adapted to a constant-potential system. The switches in this figure are all similar to those heretofore described, and the current is shunted through the motor field-coils from the + line-wire 7 by wires $a^{11}$ and $a^{12}$, and through the motor-switch Z by wires $b^{10}$ and $b^{15}$, which are connected with the contacts 19 and 18 in such switch. The circuit-controlling levers $f'$ $f^2$ in such switch are shown connected by the link $f^{10}$ with a moving armature or electro-magnet. (Designated by the letter X.)

As shown in the enlarged views in Figs. 4, 5, and 6, the field-coils E of the electro-magnetic device are held stationary upon a suitable frame, with a stud D projected between the two magnet-coils E to support a movable bridge F', carrying two cores having coils F. A weight W is attached to the bridge to hold the coils F normally equidistant from the coils E. Insulated segments $h^{10}$ and $h^{11}$ are shown fixed upon a hub attached to the bridge F', and stationary brushes $g^{10}$ and $g^{11}$ are carried by a holder upon the stud D. The segments are connected with the two coils F and the brushes are connected by the wires $f^{11}$ and $f^{12}$, respectively, with the conductors 1 and 2. The conductors are thus kept in electrical connection with the coils F when the bridge is oscillated back and forth by the magnetic attraction. The car-switch S and the landing-switch L are, like the switches shown in the other figures, provided with a series of studs adjacent to the segment 19, which is connected with the positive conductor 3, and intermediate resistances $r$ are provided between the studs, so that when the leaf $f'$ is first moved from its normal position the current must pass through the resistances $r$ before entering the stud 18 or 21. When the circuit in the switch L or S is closed with all the resistances in the circuit, the current of the independent generator that passes to the stud 18 or 21 is very weak and the magnetic movement of the shifting device X is correspondingly slight and the movement of the oscillating bridge F' is correspondingly small. The link $f^{10}$ therefore operates to shift the circuit-controller in the switch Z but a small amount and operates to close the circuit in the motor-switch with the same resistances that are included in the independent circuit. As the connector in the switch S or L is moved nearer such stud 18 or 21 and the resistances are gradually cut out, the current increases in the independent circuit, and likewise the magnetic moment of the shifting device X and the arc through which the bridge F' moves is correspondingly increased.

It is evident that by a proper adjustment of the resistances in the motor-circuit and the independent circuit the movement of the electro-magnetic device X and of the connector in the motor-switch Z can be perfectly controlled.

From the above description it will be seen that the switches and circuits may operate upon an electro-magnetic device independent of the motor, as in Fig. 3, to regulate the application of the power to and its removal from the hoisting apparatus, or the electro-magnetic device which applies the power to and removes it from the hoisting mechanism may consist in an electric motor, in which case the circuits and switches operate to vary the course of the current in the motor itself.

I am aware that a valve has been shifted by an electro-magnetic device for the purpose of opening ports for the passage of fluid under pressure to a hydraulic cylinder; but I am not aware that any electro-magnetic device has ever been placed in a circuit derived from a dynamo-electric machine, such as is commonly used at the present time for the distribution of electric light and power. Such circuits are commonly supplied with a current from a central station, and the conductors for such circuit are represented in the attached drawings by the line-wires "+ line 7" and "— line 8."

When an electro-magnetic shifting apparatus is placed in such a circuit, the circuit would be furnished with either a current of constant strength or constant potential, and none of the "make-and-break" switches heretofore used in connection with a magnetic shifting apparatus could be used in such case, as a short circuit is not admissible when a current of constant potential is employed, and an open circuit is not admissible when a current of constant strength is used.

The electro-magnetic shifting devices heretofore used have been constructed with merely a flat vibrating armature moved to and from the end of the magnet-pole. My invention differs from such constructions in employing an oscillating armature rotated laterally toward the poles of an electro-magnet, by which construction the attractive force of the magnetic poles is more effectively employed.

It is obvious that a single flat armature cannot be advantageously moved through a considerable arc by a single attraction of the magnet-poles, owing to the great reduction in the magnetic attraction as the armature recedes from the poles, and a series of armatures fitted together upon the same shaft and arranged to be attracted successively by a series of magnets have therefore been used to secure a considerable angular movement in an electro-magnetic shifting device, as in United States Letters Patent No. 316,780, dated April 26, 1887.

By my construction the armature is not only located and operated more favorably in the magnetic field, but an electro-magnetic armature is, when desired, opposed to electro-magnetic poles, and coils are applied to the armature as well as to the magnet poles or cores, and circuit connections are provided with switch-contacts to reverse the current in such coils and to thus simultaneously alter the polarity of both the armature and magnet.

I hereby disclaim any construction in which a flat armature is vibrated at right angles to the surface of the magnet-poles and limit this part of my invention to an oscillating armature movable (upon a pivot) tangential to or parallel with the surface of the magnet-pole, so that the movement of the armature is not limited by contact with or approximation to the surface of such poles.

I have made no specific claim herein to the combination, with an elevator-car and its landings and an electric motor and mechanism connecting the motor to the elevator-car, of electrical switches on said landings, an electric switch in the elevator-car, and a line-circuit and connections for all of said switches and for the motor, as I have claimed the same in my patent, No. 449,611, issued March 31, 1891, in the prosecution of the application for which patent the said combination was made the issue of an interference in which priority was awarded to me; nor have I made any claim herein to operating an electric elevator by landing-switches only, as I have claimed the same in my patent, No. 449,662, issued April 7, 1891.

What I claim herein, and desire to secure by Letters Patent, is—

1. In an electric-elevator system, the combination, with an electric motor and hoisting mechanism operated thereby and provided with a hoisting-rope, of a car suspended by such rope in a hoistway, a motor-circuit supplied with a current of constant potential, a switch upon the car with contacts in said circuit, and a circuit-controller operating normally to open said circuit and operating with the contacts when moved to close the circuit through the motor to actuate the hoisting mechanism.

2. In an electric-elevator system, the combination, with a suspended car moving in a hoistway, of hoisting mechanism operated by an electric motor, a motor-circuit supplied with a current of constant potential, and a series of switches having contacts arranged in multiple arc in said circuit, and circuit-controllers in such switches operating, when moved from their normal position, to close the circuit through the motor to actuate the hoisting mechanism, as set forth.

3. In an electric-elevator system, the combination, with a suspended car moving in a hoistway, of hoisting mechanism operated by an electric motor, continuous electrical conductors fixed in the hoistway and connected with an electric generator and with the motor, moving contacts affixed to the car, and a switch upon the car having separate contacts connected with said moving contacts, and a circuit-controller in the switch operating normally to open said circuit and operating, when moved in opposite directions, to close the circuit through the motor in reverse directions, substantially as set forth.

4. In an electric-elevator system, the combination, with a suspended car moving in a hoistway, of hoisting mechanism operated by an electric motor, a door-bolt held normally engaged, an electro-magnet adapted, when energized, to retract the door-bolt and release the door, a motor-circuit, a branch circuit connected with the coils of said magnet, contacts adapted to close such branch circuit when connected, and a metallic plate upon the car adapted to touch such contacts when the car is moved to the landing and to thus connect the said contacts and close the circuit through the coils of the magnet to unlock the door, substantially as herein set forth.

5. In an electric-elevator system, the combination, with a suspended car moving in a hoistway provided with landings, of hoisting mechanism operated by an electric motor, electrical conductors fixed in the hoistway and connected with an electric generator and with the motor, moving contacts affixed to the car and pressed upon such conductors, a switch upon the car connected with such moving contacts, a break in one of the conductors beyond the movement of such contacts, a switch to close the break, and a connection from the said switch to each landing adapted to actuate the said switch by the opening of the door at each landing to break the conductor and thus prevent the starting of the motor until the door is closed and the switch restored to its normal position, substantially as set forth.

6. In an electric-elevator system, the combination, with a suspended car moving in a hoistway provided with landings, of hoisting mechanism operated by an electric motor, electrical conductors fixed in the hoistway and connected with an electric generator and with the motor, moving contacts affixed to the car and pressed upon such conductors, a switch upon the car connected with such moving contacts, a break in one of the conductors beyond the movement of such contacts, a branch circuit connected with the conductors at the opposite sides of such break, and a door-switch held normally open in such branch circuit at each landing and closed by the closing of the door at such landing to prevent the starting of the motor until the door is closed, substantially as set forth.

7. In an electric-elevator system, the combination, with a suspended car moving in a hoistway having landings, of hoisting mechanism operated by an electric motor, an electric circuit supplied with a current of constant potential, switches upon the landings, and a switch upon the car, certain contacts in all the said switches being connected with the circuit in multiple arc and each switch being provided with a circuit-controller operating normally to open said circuit and operating with the contacts when moved to close the circuit through the motor to actuate the hoisting mechanism, substantially as set forth.

8. In an electric-elevator system for a series-wound motor to operate with a current of constant potential, substantially as herein set forth, the combination, with an electric motor, of four continuous conductors fixed along the hoistway, a car provided with sliding contacts for such conductors, connections from two of said conductors to the motor-commutator brushes, a connection from one terminal of the field-coils to a third or field conductor, a connection from the main-circuit wire to the fourth or line conductor, and a switch having suitable contacts connected with the four conductors, with resistance-contacts in the connections to the brush-conductors, the switch being arranged and operated to connect the brush-conductors alternately with the field and line conductors to reverse the motion of the motor when desired, substantially as herein set forth.

9. In an electric-elevator system, the combination, with a suspended car moving in a hoistway, of hoisting mechanism operated by an electric motor, a motor-circuit supplied with a current of constant potential, a switch arranged upon the car and switches upon the landings with contacts in said circuit, certain contacts in all the said switches being connected with the circuit in multiple arc, and each switch being provided with a circuit-controller operating normally to open said circuit and operating, when moved, to close the circuit through the motor to actuate the hoisting mechanism, and fusible plugs being inserted in an electrical conductor between the switches, as and for the purpose set forth.

In testimony whereof I have hereunto set my hand in the presence of two subscribing witnesses.

WM. BAXTER, JR.

Witnesses:
L. LEE,
THOS. S. CRANE.